United States Patent [19]

Kojima et al.

[11] Patent Number: 5,409,993
[45] Date of Patent: Apr. 25, 1995

[54] FLUID GASKET COMPOSITION

[75] Inventors: Kazuhiro Kojima, Hachioji; Minami Hanada, Tama, both of Japan

[73] Assignee: Three Bond Co., Ltd., Tokyo, Japan

[21] Appl. No.: 172,190

[22] Filed: Dec. 23, 1993

[30] Foreign Application Priority Data

Dec. 25, 1992 [JP] Japan .................. 4-357730

[51] Int. Cl.$^6$ .............................................. C08L 83/06
[52] U.S. Cl. .................... 525/104; 525/105;
  525/106; 525/403; 525/446; 525/453; 525/474;
  525/477; 525/100
[58] Field of Search ............... 525/105, 121, 104, 106,
  525/100, 403, 446, 453, 474, 477, 105, 121

[56] References Cited

U.S. PATENT DOCUMENTS

| | | | |
|---|---|---|---|
| 3,441,534 | 4/1969 | Knaub | 525/105 |
| 3,834,578 | 9/1974 | Smith | 525/130 |
| 3,860,539 | 1/1975 | Miyazato | 524/519 |
| 4,185,041 | 1/1980 | Griffin | 525/188 |
| 4,196,259 | 4/1980 | Augustin | 521/54 |
| 4,202,807 | 5/1980 | Moretto | 525/474 |
| 4,426,488 | 1/1984 | Wyman | 524/783 |
| 4,536,546 | 8/1985 | Briggs | 525/86 |

FOREIGN PATENT DOCUMENTS 54-45363  10/1979  Japan .

*Primary Examiner*—David Buttner
*Attorney, Agent, or Firm*—Oblon, Spivak, McClelland, Maier & Neustadt

[57] ABSTRACT

Fluid gasket composition with fine rubber particles has sufficient elasticity. The particle size of the rubber particles contained in the fluid gasket composition is desired to be 0.1 to 3.0 mm. The fluid gasket composition applied to a joint portion between mechanical parts or the like exhibits an effect of sealing and absorbing vibrations, dislocation and mechanical movements taking place in the mechanical parts.

2 Claims, No Drawings

FLUID GASKET COMPOSITION

BACKGROUND OF THE INVENTION

1. Field of the Invention

This invention relates to fluid gasket compositions which are applied to a joint portion in a hydraulic system and has excellent vibration proofing and sealing properties capable of suitably conforming to movements of the mechanical parts.

2. Description of the Prior Art

A gasket is applied to a Joint portion between two mechanical parts such as flanges in a hydraulic system in order to prevent a fluid such as liquid and gas from leaking out from the hydraulic system. Particularly, a fluid gasket is kept in its fluidity before use, but is changed to an elastic viscous state as the time goes after being exposed to air.

There have been widely used various fluid gaskets of silicon, acrylic acid ester monomer, synthetic rubber, synthetic resin, and composites of these materials.

However, such a fluid gasket is thermolabile and, when being applied to, for example, a joint portion between flanges in the heated condition, it may possibly degrade its sealing performance because the space between the flanges expands or contracts due to heat. Furthermore, the fluid gasket applied between the flanges cannot conform to a spatial change taking place between the flanges by vibrations, dislocation or other possible causes. As a result, the fluid gasket degrading its sealing performance permits the fluid to escape out of the hydraulic system through the gasket.

When the mechanical parts such as flanges to which the fluid gasket is applied generate vibrations, the fluid gasket is required to conform to the movement of the mechanical parts so as to absorb the vibrations. However, the conventional fluid gasket is short of vibration proofing property.

As one possible way for overcoming the disadvantages brought about by the dislocation and vibrations occurring in the mechanical parts, attempts have been made to mix the fluid gasket composition with spherical particles such as fine steel balls and glass beads in order to make the layer of the fluid gasket thick.

Another way for improving the vibration proofing property of the fluid gasket has been fulfilled by dispersing metallic fibers in the fluid gasket to increase the specific gravity, as proposed in Japanese Patent Application Public Disclosure No. SHO 54-45363.

Although the fluid gasket with the steel balls or glass beads as noted above can make the gasket layer somewhat thicker, it loses elasticity, and thus, has little effect of enduring vibrations caused in the flanges or other mechanical parts.

The fluid gasket containing metallic fibers to increase the specific gravity runs counter to the needs for a light weight fluid gasket.

OBJECT AND SUMMARY OF THE INVENTION

In view of the aforesaid drawbacks of conventional fluid gasket compositions, it is an object of the present invention is to provide fluid gasket compositions having sufficient elasticity and excellent vibration proofing and sealing properties capable of absorbing to vibrations taking place in mechanical parts such as flanges and suitably conforming to dislocation caused between the mechanical parts due to the vibrations.

To attain the object described above according to the present invention, there are provided fluid gasket compositions comprising gasket ingredients in which 5% to 50% by volume of rubber particles having 0.1 to 3.0 mm average particle size are dispersed.

Other and further objects of this invention will become obvious upon an understanding of the embodiments described below and the appended claims, and various advantages not referred to herein will occur to one skilled in the art upon employment of the invention in practice.

DESCRIPTION OF THE PREFERRED EMBODIMENTS

As the principal gasket ingredients of the fluid gasket composition of the present invention, there may be used volatile-solvent type gasket materials made by subjecting denatured alkyd polyester, polybutene, phenolic resin, epoxy resin, triazine resin, acrylic resin, vinyl chloride, urethane resin, styrene resin, rubber materials such as butyl rubber, polyurethane, silicone rubber, polysulfide, chloroprene rubber, and/or trile rubber to dissolution in an organic solvent or dispersion in water, or reactive fluid gasket materials consisting of radical polymerizable acrylic monomers and/or moisture-curing polysiloxane.

It is desirable to use the rubber particles in the present invention, which are insoluble in the aforesaid principal gasket ingredients, have high elasticity sufficient to withstand the compression stress taking place in a joint portion between the mechanical parts such as flanges, and bring about little compressive strain. To be specific, the rubber particles may be made of natural rubber, bridged rubber, isoprene rubber, styrene rubber, nitrile rubber, butadiene rubber, chloroprene rubber, butyl rubber, acrylic rubber, urethane rubber, fluoro rubber, polysulfide rubber, styrene-butadiene rubber, ethylene propylene rubber, silicone rubber, Hypalon (chlorosulfonated polyethylene rubber), ethylene-vinylacetate rubber, chlorinated polyethylene rubber, polyester rubber, epichlorohydrine rubber, and/or chlorosulfonic polyethylene rubber.

It is preferable to use the rubber particles of 0.1 to 3.0 mm in average particle size in this invention. The particle size of the rubber particles is determined according to the contact area of the fluid gasket composition to the mechanical parts such as flanges.

When the fluid gasket contains the rubber particles having a particle size less than 0.1 nun, the fluid gasket cannot conform to dislocation or vibrations occurring in the mechanical parts. When the rubber particles with a particle size of larger than 3.0 mm are used, the fluid gasket composition cannot aptly fill up the space between the mechanical parts and plays a minor role in sealing the mechanical parts.

It is preferable to contain 5% to 50% of the rubber particles by volume in the fluid gasket.

When the fluid gasket contains less than 5 % rubber particles by volume, it cannot exhibit high elasticity enough to conform to dislocation taking place between the mechanical parts. When the rubber particles in the fluid gasket exceed 50% by volume, the space between the mechanical parts cannot be aptly filled with the fluid gasket, consequently to possibly permit a fluid handled by the mechanical parts to leak out.

Thus, the fluid gasket composition in which 5% to 50% by volume of rubber particles having 0.1 to 3.0 mm average particle size are dispersed has sufficient elasticity and excellent vibration proofing and sealing properties capable of absorbing to vibrations taking place in mechanical parts such as flanges and suitably conforming to dislocation caused between the mechanical parts due to the vibrations.

[EXAMPLE 1]

The fluid gasket compositions (EX. 1 to EX. 16) having elasticity were prepared by subjecting 20% by volume of rubber particles having the respective particle sizes mentioned in Table 1 below to dispersion in solventless type fluid gasket of silicone rubber ("THREE BOND 1216" made by Three Bond Co., Ltd.).

The evaluation tests of the fluid gasket compositions according to this invention were carried out by use of two kinds of comparative specimens (CS. 1 and CS. 2) and a reference specimen (RF. 1). One of the comparative specimens was prepared by mixing the solventless type fluid gasket composition of silicone rubber noted above with steel balls, and the other specimen was prepared by adding glass beads to the same gasket composition.

The tests (pressure proof tests) were made by respectively applying the fluid gasket compositions of the invention and the comparative specimens to a joint portion between flanges and observing leakage of a fluid from the joint portion while imparting vibrations to the flanges under the conditions noted below. The results of the tests are shown in the following Table 1.

Vibration Conditions: Vibrations of 3 kHz were imparted for 30 minutes to a jig fixed on a vibration generator, to which the specimen is applied under pressure test.

Pressure Proof Test: Experimental equipments including the jig and method which are designated in "JIS K 6820" were adopted in the tests.

The abbreviations of the rubber are stipulated by ASTM (American Society for Testing and Material) in Table 1, that is, natural rubber (NR), isoprene rubber (IR), styrene-butadiene rubber (SBR), nitrile rubber (NBR), butadiene rubber (BR), chloroprene rubber (CR), isobutylene rubber (IIR), acrylic rubber (ACM), urethane rubber (U), silicone rubber (Q), fluoro rubber (FKM), polysulfide rubber (T), ethylene propylene rubber (EPM), chlorosulfonated polyethylene rubber (CSM), epichlorohydrine rubber (ECO), and chlorosulfonic polyethylene rubber (CM).

TABLE 1

(Results of Pressure Tests) (kgf /cm$^2$)

| Particle Size (mm) | Rubber | | | | | |
|---|---|---|---|---|---|---|
| | EX. 1 NR | EX. 2 IR | EX. 3 SBR | EX. 4 NBR | EX. 5 BR | EX. 6 CR |
| 0.05 | 60 | 60 | 50 | 50 | 60 | 55 |
| 0.1 | 90 | 90 | 80 | 80 | 90 | 85 |
| 0.5 | 100 | 100 | 100 | 100 | 100 | 100 |
| 1.0 | 100 | 100 | 95 | 95 | 100 | 100 |
| 2.0 | 85 | 85 | 75 | 75 | 85 | 80 |
| 3.0 | 80 | 80 | 70 | 70 | 80 | 75 |
| 4.0 | 50 | 50 | 40 | 40 | 50 | 45 |

| Particle size (mm) | Rubber | | | | | |
|---|---|---|---|---|---|---|
| | EX. 7 IIR | EX. 8 ACM | EX. 9 U | EX. 10 Q | EX. 11 FKM | EX. 12 T |
| 0.05 | 50 | 60 | 50 | 50 | 65 | 45 |
| 0.1 | 80 | 90 | 80 | 80 | 95 | 75 |
| 0.5 | 100 | 100 | 100 | 100 | 100 | 100 |
| 1.0 | 100 | 100 | 95 | 95 | 100 | 90 |
| 2.0 | 75 | 85 | 75 | 75 | 90 | 70 |
| 3.0 | 70 | 80 | 70 | 70 | 85 | 65 |
| 4.0 | 40 | 50 | 40 | 40 | 55 | 35 |

| Particle Size (mm) | Rubber | | | | | |
|---|---|---|---|---|---|---|
| | EX. 13 EPM | EX. 14 CSM | EX 15 ECO | EX. 16 CM | CS. 1 Steel Balls | CS. 2 Glass Beads |
| 0.05 | 60 | 50 | 45 | 60 | 50 | 35 |
| 0.1 | 90 | 80 | 75 | 90 | 55 | 40 |
| 0.5 | 100 | 100 | 100 | 100 | 60 | 55 |
| 1.0 | 100 | 95 | 90 | 100 | 20 | 15 |
| 2.0 | 85 | 75 | 70 | 85 | 10 | 10 |
| 3.0 | 80 | 70 | 65 | 80 | 10 | 10 |
| 4.0 | 50 | 40 | 35 | 50 | 5 | 5 |

| Reference Specimen (RF. 1) | |
|---|---|
| Pressure Proof Property | 50 |

[EXAMPLE 2]

The amounts of the rubber particles having 0.5 mm particle size used in the pressure proof tests of this Example are shown in Table 2 below. The rubber particles of styrene-butadiene were added to the fluid gasket made of the same solventless type fluid gasket of silicone rubber "THREE BOND 1216" as used in Example 1. The fluid gasket was applied to a joint portion between flanges and tested in the same manner as in Example 1. The results of the tests are shown in Table 2 below.

TABLE 2

| Rubber Content (% by vol.) | 5 | 10 | 20 | 30 | 40 | 50 | 60 |
|---|---|---|---|---|---|---|---|
| Proof Pressure (kgf/cm$^2$) | 80 | 90 | 100 | 100 | 80 | 60 | 10 |

It will be obvious to those skilled in the art that the fluid gasket composition of this invention is not limited to use in mechanical parts such as flanges; it may of course be applied with equal utility to various substances and articles and used if desired for related purposes.

As many apparently widely different embodiments of this invention may be made without departing from the spirit and scope thereof, it is to be understood that the invention is not limited to the specific embodiment thereof except as defined in the appended claims.

What is claimed is:

1. A fluid gasket composition, comprising a fluid gasket of a moisture-curing type silicone resin, and insoluble rubber particles having an average particle size of 0.1 to 3.0 mm, 5% to 50% by volume of said rubber particles being dispersed in said fluid gasket.

2. Fluid gasket composition according to claim 1, wherein said rubber particles are made of natural rubber, isoprene rubber, styrene rubber, nitrile rubber, butadiene rubber, chloroprene rubber, butyl rubber, acrylic rubber, urethane rubber, fluoro rubber, polysulfide rubber, styrene-butadiene rubber, ethylene propylene rubber, silicone rubber, chlorosulfonated polyethylene rubber, ethylene-vinylacetate rubber, chlorinated polyethylene rubber, polyester rubber, epichlorohydrine rubber, and/or chlorosulfonic polyethylene rubber.

* * * * *